United States Patent [19]
Ariga

[11] Patent Number: 5,737,999
[45] Date of Patent: Apr. 14, 1998

[54] BLOWBY PRESSURE CONTROL ABOVE AN OIL CONTROL RING IN A RECIPROCATING INTERNAL COMBUSTION ENGINE

[75] Inventor: Susumu Ariga, San Antonio, Tex.

[73] Assignee: Southwest Research Institute, San Antonio, Tex.

[21] Appl. No.: 818,540

[22] Filed: Mar. 14, 1997

[51] Int. Cl.$^6$ .................................................. F01B 31/10
[52] U.S. Cl. ........................... 92/158; 92/153; 123/193.6; 277/71
[58] Field of Search ..................... 92/157, 158, 159, 92/208, 160; 123/193.6; 277/71, 173, 176, 177

[56] References Cited

U.S. PATENT DOCUMENTS

| | | | |
|---|---|---|---|
| 1,584,520 | 5/1926 | Duncan | 277/173 |
| 1,605,040 | 11/1926 | Kreis . | |
| 1,984,409 | 12/1934 | Godron | 277/71 |
| 2,213,452 | 9/1940 | Paton | 277/173 |
| 2,857,218 | 10/1958 | Pachernegg . | |
| 3,494,262 | 2/1970 | Holcombe . | |
| 3,521,531 | 7/1970 | Kaesemodel . | |
| 4,103,594 | 8/1978 | Geffroy | 92/159 |
| 4,669,369 | 6/1987 | Holt et al. . | |
| 4,794,848 | 1/1989 | Melchoir . | |
| 4,848,212 | 7/1989 | Kawano et al. . | |
| 4,962,691 | 10/1990 | Kanao . | |
| 5,323,744 | 6/1994 | Kusama et al. . | |
| 5,490,445 | 2/1996 | Rao et al. | 123/193.6 |
| 5,655,433 | 8/1997 | Santi | 92/208 |

*Primary Examiner*—Thomas E. Denion
*Attorney, Agent, or Firm*—Jenkens & Gilchrist

[57] ABSTRACT

A plurality of passageways were provided between the inter-ring cylindrical surface of a piston and a cavity formed behind an oil control ring mounted on the piston. The passageway provides for the passage of blowby gas during downward movement of the piston, thereby permitting the oil control ring to seat against the upper surface of its groove. The present invention effectively controls the flow of oil toward the compression ring of the ring assembly without the requirement for a passageway communicating the inter-ring cavity with a saturated, turbulent flow, oil environment.

3 Claims, 4 Drawing Sheets

BLOWBY PRESSURE CONTROL ABOVE AN OIL CONTROL RING IN A RECIPROCATING INTERNAL COMBUSTION ENGINE

BACKGROUND OF THE INVENTION

1. Technical Field

This invention relates generally to a piston construction for reciprocating engines, and more particularly to such a piston that includes a means for reducing oil blowby past the compression ring of a piston.

2. Background Art

It is becoming increasingly difficult to meet the emissions standards for nitrogen oxides ($No_x$) and particulate emissions (primarily unburned oil) as emission standards, in particular for diesel engines, become more stringent. Generally, it is fairly easy to optimize one or the other, but difficult to control both $No_x$ and particulate emissions simultaneously due to the tradeoffs that must be made in engine operating conditions and controls. Reduced emissions must be maintained within a small deviation over a fairly long period of time or number of miles that the engine is operated. However, the level of oil consumption as a source of oil-derived particulates varies depending on engine operating condition, engine design, and type of engine. This problem exists in both diesel and spark-ignition engines.

Also, additives commonly incorporated in lubricating oil, such as zinc- and phosphate-containing products, if emitted in sufficient quantifies into the exhaust system as a result of oil consumption, are harmful to catalysts and other after-treatment devices located in the exhaust system. Because the oil consumption mechanism of a particular engine is difficult to predict, numerous engine experiments and tests are often necessary for a particular engine design until the optimum component design and acceptable range of clearance tolerances are found for achieving a target oil consumption level. However, even with an engine optimally designed to achieve low initial oil consumption, that consumption level will increase as the engine wears.

Actual measurements made of such in-cylinder variables as ring motion, piston motion, inter-ring gas pressure and temperature, were simultaneously measured with real-time oil consumption in a modem diesel engine under step-transient operation, indicate that the amount of oil flow toward the compression ring, or rings, is significantly high in both intake and expansion strokes, especially under light load. Thus, the piston ring path appears to be lubricated with more oil than necessary. The excess amount of oil is believed to be one of the sources of in-cylinder oil consumption. The other source of in-cylinder oil consumption is attributable to distortion of the cylinder bore.

In a series of tests, conducted by the inventor of the present invention, piston ring motion measurements were made on a commercially produced heavy-duty diesel engine under no load steady state, full load steady state, and step transient operation, all at 800 RPM. The results of those measurements are shown in graph form in the lower portion of FIG. 1. The ideal motion of the off control ring is represented by a solid line 10 wherein the top of the off control ring is in desirable physical contact with the upper surface of its groove during the intake stroke (from −360° to −180° crank angle), and the expansion stroke (from 0° to 180°). In both instances the piston is moving downwardly. During the intervening compression and exhaust strokes, from −180° to 0° and from 180° to 360° respectively, the piston is moving upwardly and desirably the oil control ring is seated at the bottom of its groove. The motion of the oil control ring under no load conditions is represented by a dashed line 12, under full load conditions by an alternating dash and dot line 14, and under step transient conditions by a dotted line 16. In the upper portion of the graph shown in FIG. 1, the corresponding pressure above the oil control ring, representing blowby pressure in the inter-ring cavity, is likewise shown. The inter-ring pressure under no load at 800 RPM is represented by a dashed line 18, under full load conditions at 800 RPM by an alternating dot and dash line 20, and under step transient operation at 800 RPM from no load to full load by a dotted line 22.

The measurements indicate that there is considerable clearance between the top of the oil control ring and the upper surface of its groove when the piston is moving downwardly during the intake and expansion strokes (crank angle from −360° to −180° and 0° to 180°, respectively). Furthermore, it should be noted that during the expansion stroke (crank angle 0° to 180°) the clearance between the top of the oil control ring and the upper surface of its groove is greatest. It is also noted that the blowby pressure also peaks during this portion of the cycle and reaches its maximum value early in the expansion stroke when the oil control ring-groove surface clearance is greatest, particularly under no load and step transient operation.

Thus, the above measurements indicate that even though the piston is moving downwardly, there is a clearance between the oil control ring and the top of its groove. Through this groove, a substantial amount of oil flows toward the compression ring during downward movement of the piston. Ideally, the oil control ring restricts oil flow when the piston is moving downward in order to reduce oil consumption due to oil flow through the ring path. However, as the measured data demonstrates, it is found that the oil control ring takes a relatively long time in each cycle to move from the bottom to the top of its groove, especially under light load and transient operation.

In another series of tests on the same engine, it was found that piston temperature takes a considerable amount of time, on the order of about 800 seconds, to stabilize from no load to full load operation at 800 RPM, even though torque output reached its near full load value in about 45 seconds. Accordingly, oil viscosity changed from high to low during the step transient cycle operation as the component temperatures increased and finally stabilized. Before oil temperature stabilized at the higher temperature, oil between the oil control ring and its groove was likely to produce a high damping force (squeeze film effect) and prevent the oil control ring from contacting the upper surface of its groove during the intake and expansion strokes. It is strongly believed that this explains why the oil control ring does not completely seat against the upper groove surface during downward motion of the piston. Thus, oil between the piston skirt and the cylinder wall is forced by the piston, moving downwardly, to flow through the clearance between the upper surface of the oil control ring and the upper surface of the groove toward the compression ring.

FIGS. 2 and 3 show the calculated oil flow through the clearance between the oil control ring and the upper surface of the groove during downward motion of the piston, based on the measured data illustrated in FIG. 1. The calculated oil flow through the oil control ring under no load conditions is shown in the lower portion of FIG. 2. The measured position of the oil control ring with respect to the top of its groove, under no load operation as shown in FIG. 1, is replicated in the top portion of FIG. 2 for reference purposes. FIG. 3 shows the calculated oil flow through the oil ring for approximately 42 seconds during the step transient at 800

RPM from no load to full load. The lower dotted line represents the oil flow during the intake stroke and the upper solid lines represents oil flow during the expansion stroke. Thus, the above measurements and calculated values demonstrate that varying amounts of oil are pumped into the inter-ring pack area, depending on engine load and oil temperature. Therefore, an effective method to control the oil flow is necessary to achieve a low oil consumption level in a new engine, and maintain low oil consumption during the life of the engine, under all operating conditions.

Several attempts have been made heretofore to provide a vent in the piston wall between the upper compression ring and the lower oil compression ring, and hopefully provide better sealing by the oil control ring. For example, U.S. Pat. No. 4,669,369 issued Jun. 2, 1987 to Jeremy Holt, et al, proposes the optional use of a plurality of drainage holes between the inter-ring surface Of the piston and the interior of the piston. Similar drainage holes are described in U.S. Pat. No. 3,521,531 issued Jul. 21, 1970 to Kaesemodel, and U.S. Pat. No. 2,857,218 issued Oct. 21, 1958 to Pachernegg. All of the above references describe drainage holes extending between the outer cylindrical wall of the piston and the interior of the piston. However, it should be noted that during engine operation, a considerable amount of very turbulent oil is splashed into the interior piston cavity, and thus the holes, positioned as shown in the references, could easily provide an additional oil supply source rather than acting as drainage holes.

The present invention is directed to overcoming the problems set forth above. It is desirable to have a piston wherein a passageway is provided for relieving blowby pressure without having a hole, or other passageway, in direct communication with a high flow velocity, oil-flooded piston interior. It is also desirable to have such a piston arrangement that allows the oil control ring of the piston to readily seat against the top surface of its groove during downward motion of the piston.

BRIEF SUMMARY OF THE INVENTION

In accordance with one aspect of the present invention, a piston for internal combustion engines has at least two annular grooves formed in the outer cylindrical surface of the piston. Each of the grooves have a radially inwardly disposed base defined by a cylindrical wall that has a diameter less than the diameter of the outer cylindrical surface of the piston and upper and lower spaced-apart radial walls extending between the base of the groove and the outer cylindrical surface of the piston. Each of the grooves are adapted to receive an annular ring. At least one of the annular grooves, comprising a first groove, is disposed adjacent the crown end of the piston and is adapted to receive a compression ring therein. At least one other of the annular grooves, defining a second groove, is spaced from the crown end of the piston and is adapted to receive an oil control ring. The piston further includes a plurality of passageways extending between the outer cylindrical surface of the piston, at a position between the first groove and the upper radial wall of the second groove at a position adjacent to the base of the second groove.

Other features of the piston for an internal combustion engine, embodying the present invention, include each of the passageways having, alternatively, a circular cross-section or a shape forming a slot extending between the outer cylindrical surface of the piston and the radial wall of the second groove at a position adjacent the base of the second groove.

BRIEF DESCRIPTION OF THE DRAWINGS

A more complete understanding of the structure and operation of the present invention may be had by reference to the above-described discussion and the following detailed description when taken in conjunction with the accompanying drawings, wherein.

DETAILED DESCRIPTION OF THE INVENTION

Figure 1:
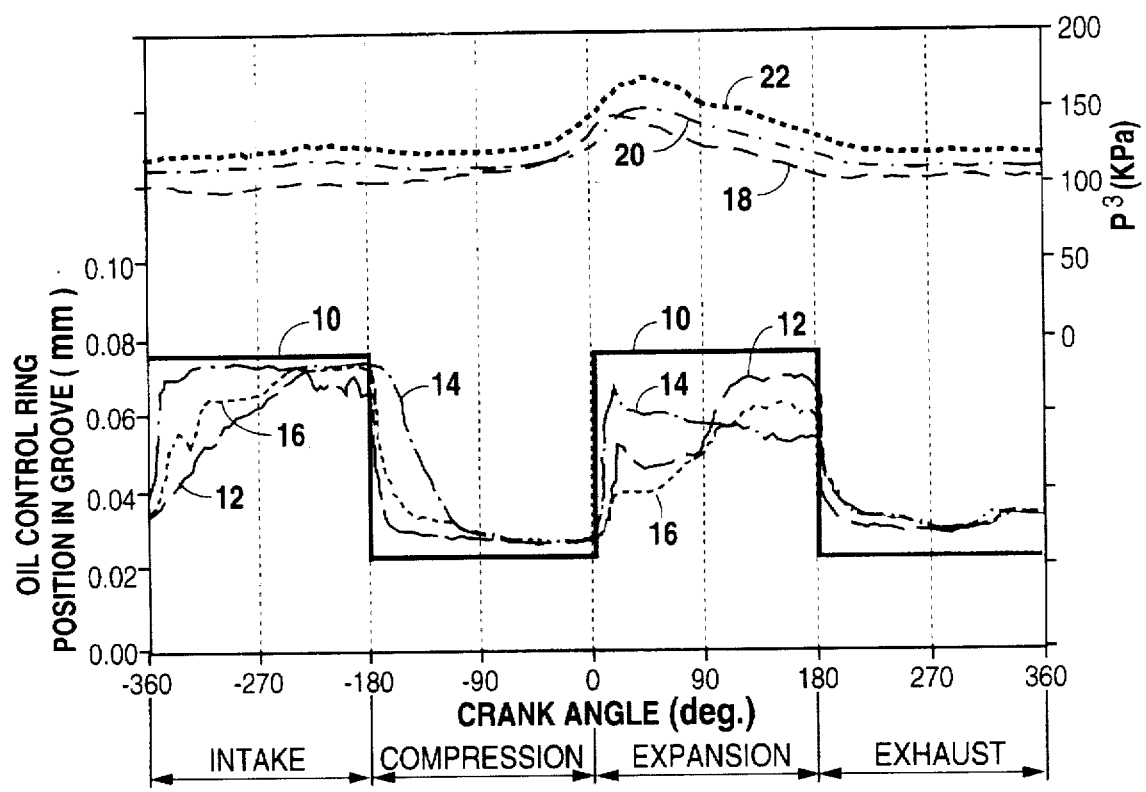
FIG. 1 is a graphical representation of the oil control ring motions and inter-ring pressures of a conventional diesel engine operating at 800 RPM under no load, full load, and step transient operating conditions.
Figure 2:
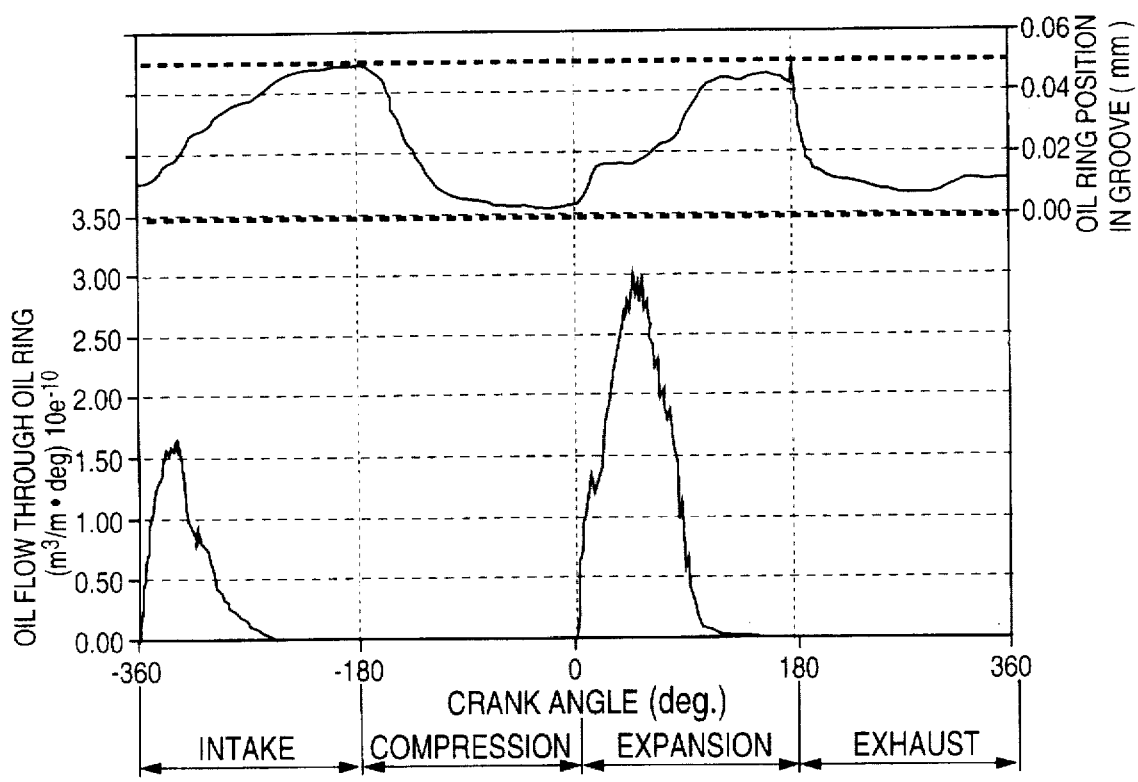
FIG. 2 is a graphical representation of the calculated oil flow through the oil control ring of the same engine tested in FIG. 1, with the corresponding inter-ring pressure when the engine was operating at 800 RPM under no load.
Figure 3:
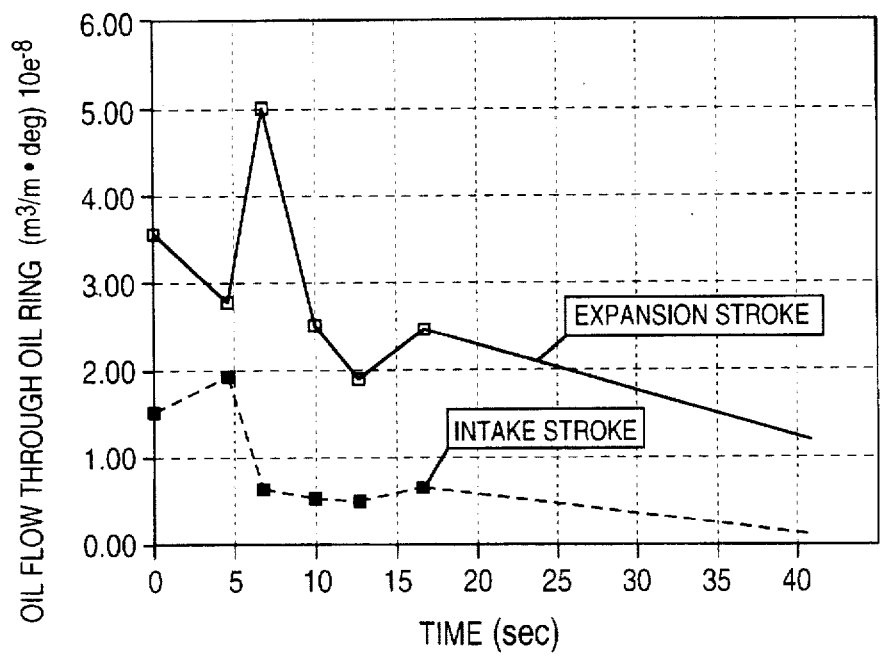
FIG. 3 is a calculation of the volume of oil flow through the oil control ring, based on the measurements shown in FIG. 1, when the engine is operating under step-transient conditions at 800 RPM from no load to 100% load.
Figure 4:
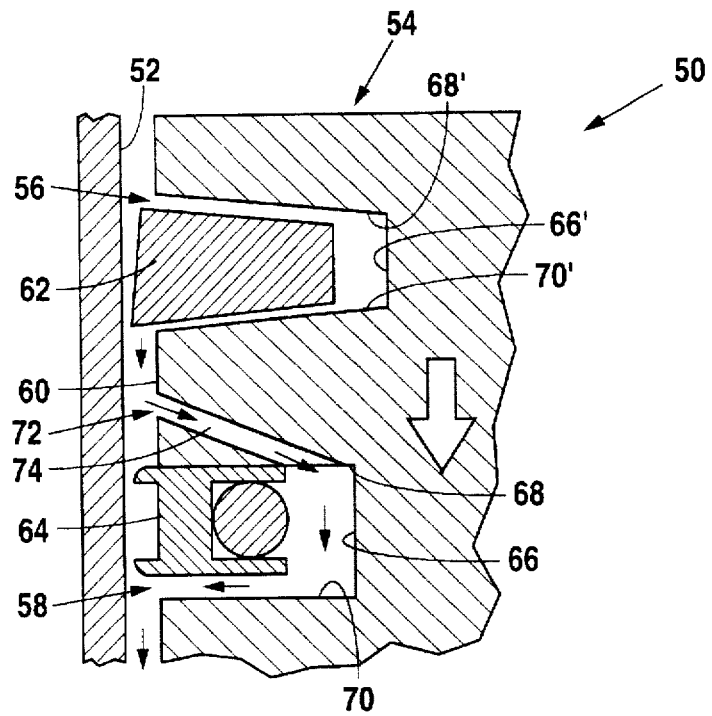
FIG. 4 is a cross-sectional view of a portion of a piston embodying the present invention, showing the position of the oil control ring when the piston is moving in a downward direction.
Figure 5:
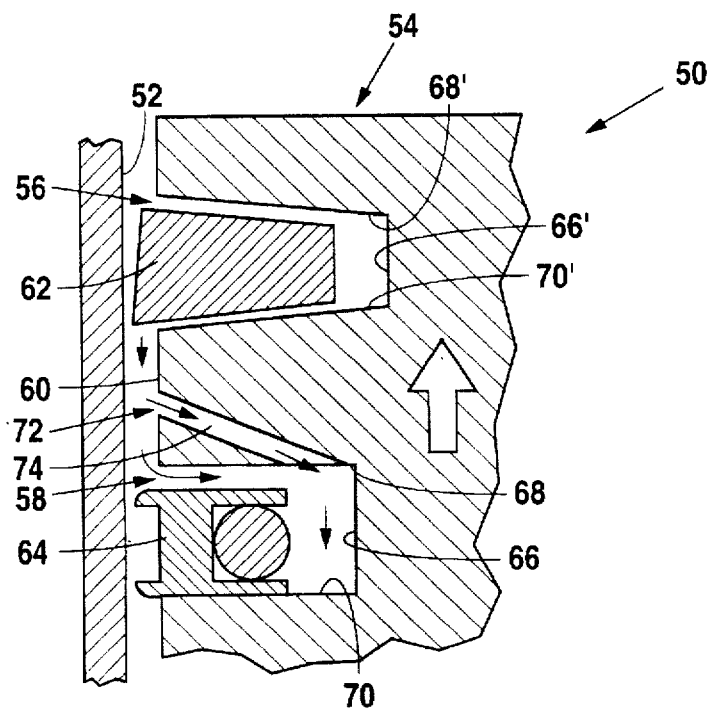
FIG. 5 is a cross-sectional view of a portion of the piston embodying the present invention, showing the position of the oil control ring when the piston is moving in a upward direction.

A portion of a piston 50, embodying the present invention, is shown in section in FIGS. 4 and 5. The piston 50 is of the type used in reciprocating internal combustion engines in which the piston 50 is disposed in a bore 52 of a cylinder. The piston 50 has a crown end 54 which cooperates with the cylinder wall or bore 52 and a cylinder head of the engine, not shown, to define a combustion chamber. Furthermore, the piston 50 includes at least two annular grooves 56, 58 formed in an outer cylindrical surface 60 of the piston 50. The upper annular groove 56, is positioned in close proximity to the crown end 54 of the piston 50 and is adapted to receive a compression ring 62 therein. The lower, or second, groove 58 is spaced from the crown end 54 of the piston 50 and is adapted to receive an oil control ring 64 in the groove.

Although both of the annular grooves 56, 58 are somewhat similar in construction, the following description is directed primarily to the construction of the second, or lower annular groove 58, with particular features of that groove identified in the drawings. Corresponding parts in the upper cylindrical groove are identified by the same reference number with a prime (') symbol added after the numeral. The grooves 58, 56 each respectively have a radially inwardly disposed base 66, 66', each of which is defined by a cylindrical wall having a diameter less than the diameter of the outer cylindrical surface 60 of the piston 50. Each of the annular grooves 58, 56 also have an upper radial wall 68, 68' and a respective spaced-apart lower radial wall 70, 70'. The upper radial walls 68, 68' and the lower radial walls 70, 70' extend between the respective base 66, 66' of the corresponding annular grooves 56, 58 and the outer cylindrical surface 60 of the piston 50.

The upper annular groove 56 is adapted to receive a conventional compression ring 62, and the lower, or second annular groove 58 is adapted to receive a conventional oil control ring 64. As shown in the drawings, the oil control ring 64 has an inner diameter that is somewhat greater than the diameter of the base 66 of the receiving groove 58. Thus, a substantially enclosed cavity is formed behind the oil control ring 64 and is defined by the inner diameter of the oil control ring 64, and the upper and lower radial walls 68, 70 and the base 66 of the groove 58.

In the interest of brevity and the avoidance of undue extraneous explanation, only two rings are shown in the drawings and discussed herein. However, it should be noted that the piston 50 may contain additional rings. More specifically, the piston 50 may comprise two or more compression rings 62 and two or more oil control rings 64.

Importantly, in the present invention, the piston 50 has a plurality of passageways 72 extending between the outer cylindrical surface 60 of the piston 50 at a position between the first groove 56, and the upper radial wall 68 of the second groove 58 at a position adjacent the base 66 of the second groove 58. The passageway 72 may be either in the shape of a hole 74 having a cylindrical cross-section, or a slot 76 cut into the outer surface 60 of the piston 50 with the top of the slot extending at a downward angle with respect to the upper radial wall 68 of the lower groove 58, to a position adjacent the base 66 of the lower groove 58. The diameter and number of holes 74 or slots 76 is a matter of design choice, and will vary depending upon the size of the piston, the viscosity of the lubricating oil, and inter-ring volume defined by the bottom of the compression ring 72, the top of the oil control ring 74, the outer cylindrical surface 60 of the piston, and the inner bore of the cylinder wall 52.

Figure 6:
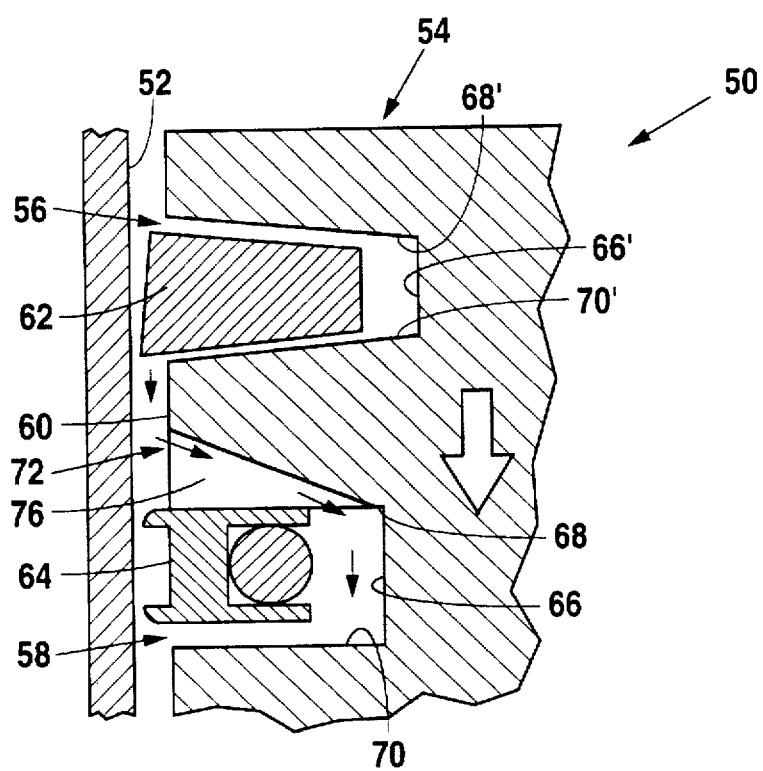
FIG. 6 is a cross-sectional view of a portion of a piston embodying the present invention, showing an alternative construction of a passageway communicating the inter-ring outer surface of the piston with a chamber behind the oil control ring of the piston.

The passageways 72 thus provide a communicating hole extending from the enclosed space above and oil control ring 64 to the cavity behind the oil control ring 64, as shown in FIGS. 4 and 6, when the piston 50 is moving in a downward direction such as at the beginning of the intake and expansion strokes. During these portions of the engine cycle, blowby gas pressure above the oil control ring 64 is relieved through the communicating hole 72. As a result, oil pressure is reduced above the oil control ring 64 and the oil control ring 64 can quickly move into sealing contact with the upper surface 68 of the groove 58. Quick movement of the oil control ring 64 toward the lower radial wall 70 of the groove 58 also provides a seal between the two members when the piston is moving upwardly at the beginning of the compression and exhaust strokes, thus providing a seal against reverse oil flow from the cylinder wall 52 into the cavity behind the oil control ring 54. As a result, the amount of oil transported to the compression ring 62 is decreased, and total oil consumption as well as variability, are substantially reduced. Importantly, gas pressure above the oil control ring 64 is reduced by venting the blowby gas through the passageways 72 to the chamber behind the oil control ring 64.

Because the passageway 76 is not directly exposed to the oil-flooded environment present in the inner piston cavity, oil is not drawn up into the inter-ring cavity. Hence, a more ideal oil control ring motion is achieved and the amount of oil passing around the oil control ring is reduced, resulting in lower total oil consumption as well as variability of consumption under different load conditions.

Although the present invention is described in terms of a preferred exemplary embodiment, with specific illustrative key constructions and arrangements for the passageway between the inter-ring surface of the outer cylindrical surface of the piston and a chamber behind the oil control ring groove, those skilled in the art will recognize that changes in those passage constructions and shapes may be made without departing from the spirit of the invention. Such changes are intended to fall within the scope of the following claims. Other aspects, features, and advantages of the present invention may be obtained from a study of this disclosure and drawings, along with the appended claims.

What is claimed is:

1. A piston for an internal combustion engine, said piston having a crown end, an outer cylindrical surface having a predetermined diameter, a first annular groove and a second annular groove each being formed in said outer cylindrical surface and having a radially inwardly disposed base defined by a cylindrical wall having a diameter less than the diameter of the outer cylindrical surface of the piston and upper and lower spaced apart radial walls extending between the base of the groove and the outer cylindrical surface of the piston and adapted to receive an annular ring therein, said first annular groove being disposed adjacent said crown end of the piston and adapted to receive a compression ring therein and said second annular groove being disposed at a position spaced from said crown end of the piston and adapted to receive an oil control ring therein, said piston further comprising a plurality of separate passageways that remain open during up and down reciprocating motion of said piston and each of which extend from the outer cylindrical surface of the piston at a position between said first annular groove and the upper radial wall of said second annual groove to a position adjacent the base of said second annular groove.

2. A piston for an internal combustion engine, as set forth in claim 1, wherein each of said passageways have a circular cross-section.

3. A piston for an internal combustion engine, as set forth in claim 1, wherein each of said passageways is a slot extending between the outer cylindrical surface portion of the piston and the upper radial wail of the second groove at a position adjacent the base of said second groove.

* * * * *